(12) United States Patent
Castagna

(10) Patent No.: US 11,762,650 B1
(45) Date of Patent: Sep. 19, 2023

(54) METHOD AND APPARATUS FOR SECURE OFFLINE SOFTWARE UPDATE

(71) Applicant: General Dynamics Mission Systems, Inc., Fairfax, VA (US)

(72) Inventor: Antonio Castagna, Pittsfield, MA (US)

(73) Assignee: General Dynamics Mission Systems, Inc.

(*) Notice: Subject to any disclaimer, the term of this patent is extended or adjusted under 35 U.S.C. 154(b) by 3 days.

(21) Appl. No.: 17/454,955

(22) Filed: Nov. 15, 2021

Related U.S. Application Data (60) Provisional application No. 63/198,838, filed on Nov. 16, 2020.

(51) Int. Cl.
  G06F 9/445 (2018.01)
  G06F 8/65 (2018.01)
  G06F 21/57 (2013.01)

(52) U.S. Cl.
  CPC .............. *G06F 8/65* (2013.01); *G06F 21/57* (2013.01); *G06F 2221/033* (2013.01)

(58) Field of Classification Search
  CPC ....... G06F 8/65; G06F 21/57; G06F 2221/033
  See application file for complete search history.

(56) References Cited

U.S. PATENT DOCUMENTS 10,447,483 B1 * 10/2019 Su .................. H04L 9/3226
2020/0387367 A1 * 12/2020 Eklund .............. H04L 9/50

* cited by examiner

*Primary Examiner* — Chuck O Kendall
(74) *Attorney, Agent, or Firm* — LKGlobal | Lorenz & Kopf, LLP (57) ABSTRACT

A computing device including a first processor configured for generating a directory structure in response to a metadata associated with a software, retrieving an update file, performing the software update on a test system, and verifying the software update. A memory configured for storing the software update in the directory structure. A second processor configured for confirming the validity of the software update, performing the software update on a secure computing system in response to a positive confirmation of the validity of the software update and generating an indication of an update of the secure computing system. A display configured to display the directory structure and the indication of the update of the secure computing system.

20 Claims, 4 Drawing Sheets

Fig. 4

US 11,762,650 B1

METHOD AND APPARATUS FOR SECURE OFFLINE SOFTWARE UPDATE

CROSS-REFERENCE TO RELATED APPLICATION

This application claims the benefit of U.S. Provisional Application No. 63/198,838, filed Nov. 16, 2020, which is incorporated herein by reference in its entirety.

STATEMENT REGARDING FEDERALLY SPONSORED RESEARCH OR DEVELOPMENT

This invention was made with government support under N00030-15-C-0001 awarded by Department of Navy. The government has certain rights in the invention.

TECHNICAL FIELD

The technical field relates generally to secure software updates, and more particularly relates to an offline method and apparatus for performing periodic operating system updates for a secure computing environment while maintaining adherence to industry standard Application Programing Interfaces (API) and vendor outlined sanctioned practices to identify, scan, download, install, and commit software updates.

BACKGROUND

Manufacturers of trusted operating systems and applications regularly release a wide array of software updates to address issues and take advantage of opportunities. Issues encompass flaws of varying levels, while opportunities introduce enhancements or efficiencies. The sheer volume of updates of a typical manufacturer for its products necessitates a system of significant complexity that is highly normalized. Normalized may refer to a Universally Unique Identifier (UUID) or Globally Unique Identifier (GUID) used to identify a single update. Normalization in this context is analogous to ZIP Codes representing both City and State. By representing City and State using ZIP Codes achieve efficient precision because a sequence of 5 digits are used to uniquely represent variable length values of City and State. Humans do not natively process information that is highly normalized in this way. Software Updates utilize UUID/GUID of 128 bits. In this context a bit can be thought of a digit, so imagine if ZIP Codes had 128 digits instead of 5, making human memorization impossible. Software update processes have evolved to rely heavily on a client server relationship to exchange metadata between target system to be patched (client) and repository (server) and capitalize on the economies of scale afforded by cloud computing—while dealing with the extremely long UUID/GUID for precision. These complex systems are also subject to human error conditions on large groups of computers, such that some target computers may be overlooked to be evaluated. Performing only secure updates is especially critical for computer systems which control dangerous equipment, military applications or other national security related applications so aspects of metadata exchanges and cloud computing are prohibited.

Traditional Software Updates infrastructures may expose a secure network attack surface via the exchange of metadata between client and server—such as server hierarchal implementations, logical addressing schemes, make, model, and hardware versions associated to a given software update—target to be updated. A bad actor may attempt to utilize this software update infrastructure as a venue to acquire intelligence. In a secure network environment, performing software updates increases the time and cost required by support personnel by requiring that each element of the updates is pretested and verified on a separate isolated network while obfuscating metadata. Additionally, the evaluation process is very much a black box to the average human. As such, it is desirable to provide a secure, fortified non-reputation and chain of custody software updates system for providing software and system updates in a secure network computing environment. In addition, other desirable features and characteristics will become apparent from the subsequent summary and detailed description, and the appended claims, taken in conjunction with the accompanying drawings and this background.

SUMMARY

Disclosed herein are computing systems, computing algorithms, computers, computer networks and related control logic for provisioning computing systems, methods for making and methods for operating such systems, and other computing equipped with automated software update algorithms. By way of example, and not limitation, there is presented method and apparatus for secure offline software updates in a secure computing network environment.

In a first non-limiting embodiment, an apparatus includes an interface configured for receiving a metadata file indicative of a first software update and a second software update, a first processor configured for generating a directory structure in response to a metadata associated with the first software update and the second software update, for retrieving a first software update file and a second software update file, to perform the first software update and the second software update on a test system, and to verify a validity of the first software update and a validity of the second software update, a memory configured for storing the first software update and the second software update in the directory structure, a second processor for confirming the validity of the first software update and the validity of the second software update, for performing the first software update and the second software update on a secure computing system in response to a positive confirmation of the validity of the first software update and the validity of the second software update and for generating an indication of an update of the secure computing system, and a display configured to display the directory structure and the indication of the update of the secure computing system.

In accordance with another aspect of the present disclosure, a method includes receiving, by a network interface, a metadata file indicative of a first software update and a second software update, generating, by a first processor, a directory structure in response to a metadata associated with the first software update and the second software update, retrieving, by the first processor, a first software update file and a second software update file, performing, by the first processor, the first software update and the second software update on a test system, verifying, by the first processor, a validity of the first software update and a validity of the second software update, confirming, by a second processor, the validity of the first software update and the validity of the second software update, performing, by the second processor, the first software update and the second software update on a secure computing system in response to a positive confirmation of the validity of the first software update and the validity of the second software update, generating, by the second processor, an indication of an update of the secure computing system, and displaying, by a user interface, the directory structure and the indication of the update of the secure computing system.

In accordance with another aspect of the present disclosure, a computing device includes a first processor for generating a hierarchical directory structure on a virtual hard drive in response to an update metadata file, for retrieving an update file, for executing the update file on a test system, for validating the update on the test system, and for storing the update file within the hierarchical directory structure in response to a positive validation of the update on the test system, a user interface for displaying the hierarchical directory structure, an indication of the positive validation of the update on the test system, and for receiving a user input, and a second processor for retrieving the update file from the hierarchical directory structure on the virtual hard drive and executing the update file on an operation system in response to the user input.

Other objects, advantages and novel features of the exemplary embodiments will become more apparent from the following detailed description of exemplary embodiments and the accompanying drawings.

BRIEF DESCRIPTION OF DRAWINGS

The above-mentioned and other features and advantages of this invention, and the manner of attaining them, will become more apparent and the system and method will be better understood by reference to the following description of embodiments of the invention taken in conjunction with the accompanying drawings.

The exemplifications set out herein illustrate preferred embodiments of the invention, and such exemplifications are not to be construed as limiting the scope of the invention in any manner.

DETAILED DESCRIPTION

The following detailed description is merely exemplary in nature and is not intended to limit the invention or any application or use of the invention. Furthermore, there is no intention to be bound by any theory presented in the preceding background or the following detailed description. Various non-limiting embodiments of Software Update systems, Software Update algorithms, and Software are provided. In general, the disclosure herein describes a Software Update control system design to be used as stand-alone mechanism or compliment in an already-established Software Update System.

When a large software system, such as an operating system, is regularly updated, all of the updates are not typically transmitted to the system to be updated to reduce the amount of data being transmitted. Likewise, update patches are not transmitted for components that are not installed or have already been updated with previous patches. To determine which updates should be transmitted, a metadata file may be transmitted including metadata describing each of the available updates after a target (client) system identifies itself by linkable criteria such as OS, IP Address, Bios Version etc. For example, in a Microsoft Windows environment, Windows Software Update Services (WSUS) is Server Component that houses all metadata in a Microsoft SQL Server database. In some cases, software servicing stacks are necessary for successful communication between server and client. A software servicing stack is analogous to using a second car to jumpstart another car before it can be driven. Software servicing stacks, if not managed properly, may produce false negative meaning that targets need updates but report none are needed. Once the client reports to WSUS, the client will retrieve all applicable updates that have been approved by a system administrator after testing.

In an air-gapped environment, a database maintained by an OFF-LINE WSUS that needs to be presented to an ON-LINE WSUS to facilitate downloading of both metadata (information about patches) and the binary files that make it possible to apply an update. Operating systems have a mechanism that review the local cached repository (datastore) of metadata so a software update scan does not require network connectivity and goes against local datastore. For example, Microsoft provides a highly compressed and normalized metadata repository called wsusscn2.cab that may be transmitted inconspicuously which contains metadata related to security updates, update rollups and service packs that will populate a Microsoft Operating System's datastore. Once this local datastore is populated, a locally run algorithm may run that points to the local datastore in place of WSUS infrastructure to readily identify security updates.

The standard Microsoft update cab file, such as wsusscn2.cab, contains the metadata of only security updates, update rollups and service packs available from Microsoft Update. The cab file does not contain any information on non-security updates, tools or drivers. Computers that aren't connected to the internet can be scanned to see whether these security-related updates are present or required. The Wsusscn2.cab file doesn't contain the security updates themselves so users must obtain and install any needed security-related updates through other means. New versions of the cab file are released on the second Tuesday of each month as security-related updates are released, removed, or revised on the Windows Update site.

The exemplary system is configured to eliminate cost, attack surface, client/server interaction, and human error associated to a traditional software update system. Updates are identified in the order in which they need to be installed, via an algorithm that runs on the local computer. The process is designed to passively assess only or apply updates when paired with the hierarchical repository QFE.VHD. In either case of assessing or applying, the algorithm generates a report based on the Microsoft Baseline Security Analyzer format local to the file system. Critical to the process, the algorithm generates a command shell script that will create the hierarchical structure to be housed on a virtual drive, such as QFE.VHD. This hierarchical structure is the translation from a highly normalized non-human readable GUID/UUID data set within the datastore. This command shell script can be taken to any sanctioned online system and run to produce the human readable hierarchical directory structure that will be populated with the binaries files.

QFE.VHD is a Microsoft Virtual Hard Drive file format that when mounted on a Windows system appears as if it is another local hard drive. QFE is an acronym representing Quick Fix Engineering, Microsoft's term for patches and updates since early days of Windows NT. VHD file format is widely recognized format in both Windows and Linux platforms. Inventory is taken once before and after updates are applied. This collects wide array of information and is in htm format. Patch command ensures that all available servicing stack updates are applied prior to attempting to use the local data store. This mitigates risk of false negatives. In one exemplary embodiment, the target systems may be fully inventoried before and after patching. The inventory may use the client side API for Windows Management Instrumentation, which is Microsoft API for Web Based Enterprise Management in a closed air gaped system.

Figure 1:
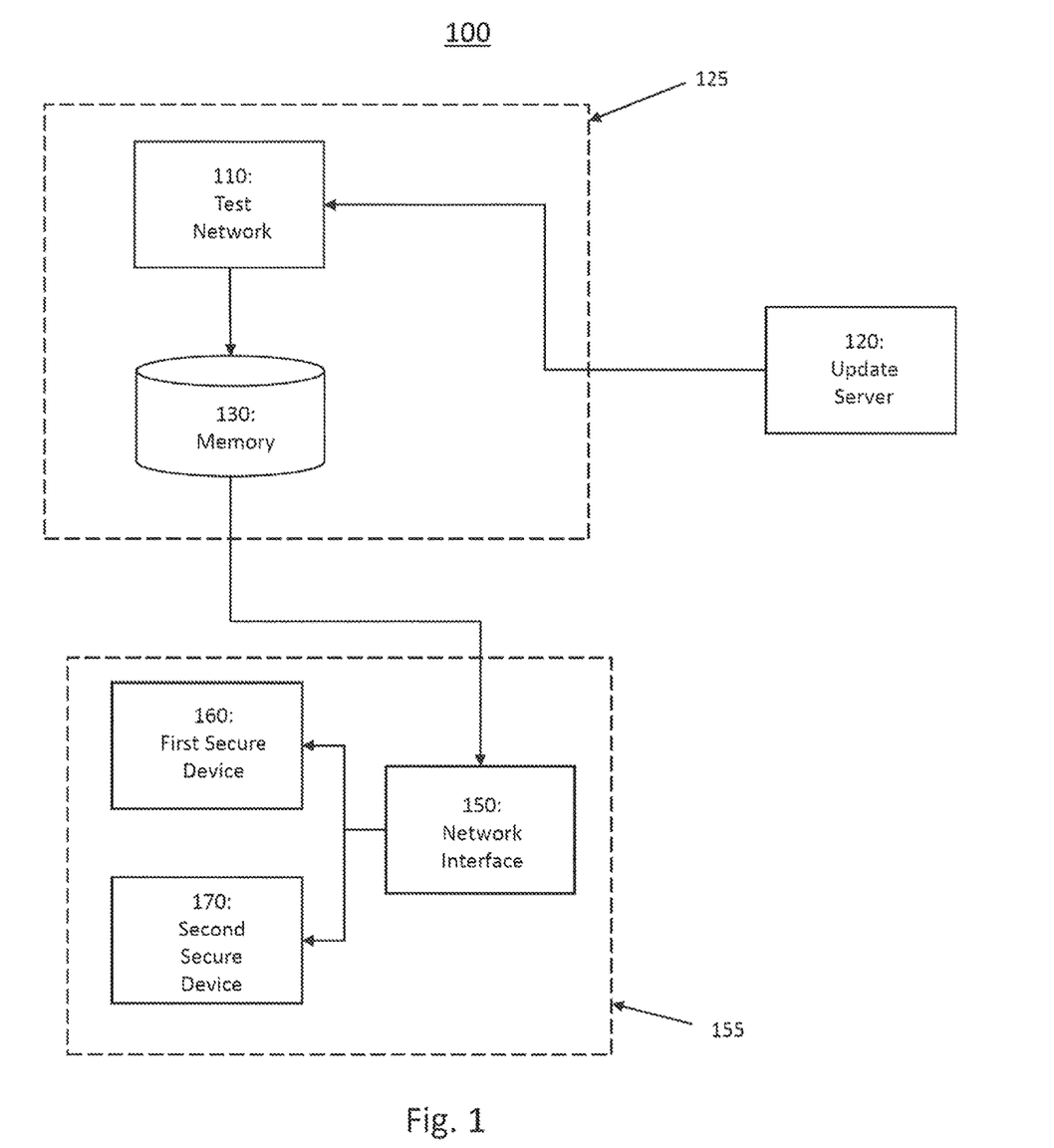
FIG. 1 is a simplified diagram illustrating a non-limiting embodiment of a system for implementing secure offline software updates in accordance with the teachings of the present disclosure.

Turning now to FIG. 1, an exemplary environment 100 for a system for implementing secure offline software updates according to an exemplary embodiment of the present disclosure is shown. In this exemplary environment 100, a notification of an available update may be received from an update server 120. The notification may be received in response to a request from a test network 110 or may be automatically received periodically, such as once per month, from the update server 120.

In this exemplary embodiment, the test network 110 may be enabled within an isolated network environment 125 with no or limited connections to devices outside of the isolated network environment 125. In one exemplary embodiment, the update may be retrieved from the update server 120 or loaded to a portable storage device. The portable storage device may then be installed within the isolated network environment 125 by a user. The isolated network environment 125 may then have no direct connection to outside devices or to the internet or the like. In one exemplary embodiment, the update file may be copied to a QFE within the test network 110.

The update received from the update server 120 may be a metadata file containing metadata descriptive of possible updates available from the update. At this time, the test network 110 may install known servicing stack updates to be placed in the QFE location. Service stack updates are proactively installed to sure that an update file may be read by the test network 110. The test network 110 may then scan the metadata file to generate a list of the updates available. The text file may be composed of select metadata from the metadata file such that that the text of the text file is easily understood by a human operator. In response to the metadata, updates corresponding to one or more secure systems 160, 170 within a secure network 155 may be identified. The test network 110 may determine which of the available updates are applicable to the test network 110. The applicable updates may be determined in response to the metadata file and the programs, updates, and features installed on the test network 110. Once the applicable updates are determined, the test network may then generate a hierarchical directory structure within the memory 130, such as the QFE, in response to the applicable updates. In one exemplary embodiment, each applicable update file may be indicated by a directory with a directory name generated in response to the update file name and/or the metadata associated with the update file.

The test network 110 may then retrieve the update files from the update server 120 and store each of the update files in its respective directory within the hierarchical directory structure within the memory 130. In one example, the QFE virtual drive containing the hierarchical directory structure may be copied to a separate system connected to the internet. The directories may be populated with the required update filed. The populated directories and associated update files may have appropriate security measures taken, such as virus scans or malware detection. The QFE may then be copied back to the test network 110 with the populated directories.

The test network 110 may then generate a first inventory indicative of the update files and directory structure on the memory 130. The test network 110 may then install the updates on the test network 110 and determine the performance of the updates on the test network 110 within the isolated environment. The test network 110 may then evaluate the performance of the test network 110, or devices within the test network 110 after the installation of the updated. Updates that install correctly, improve performance, and/or provide no security risk are then identified and a second inventory file is generated. In one exemplary embodiment, the second inventory is a list of the installed and/or updated filed on the test network and/or the files within the hierarchical directory. Alternatively, the second inventory may be a text file listing the metadata associated with the successful updates as well as digital identifiers for the successful updates, such as binary file testing results. Regression testing may be performed to identify missing patches and perform root cause analysis to identify issue cause scenarios such as issue caused by the update script, issues caused by long file name file system, and/or issue caused by an incorrect patch in the repository. The second text file may then be coupled to a memory 130 for storage.

The network interface 150 within the secure network 155 may then retrieve the second text file from the memory 130 and display the metadata related to the successfully tested updates to a user, network administrator, or the like. In one exemplary embodiment, a user may then compare this list to alternative data related to the updates by examining the readable metadata in the text file. The user may then approve the updates to be performed on the network in response to an update file received from the update server 120 and the second text file. The network interface 150 may then download the hierarchical directory structure and the approved updates from the memory 130, such as the QFE. The downloaded updates may then be compared to the digital identifiers identifying the successful updates. If the downloaded updates match the updates successfully installed by the test network 110, the network interface 150 may install the downloaded updates to the first secure device 160 and the second secure device 170 or may couple these downloaded update to the devices within the secure network 155 for installation on the devices.

Figure 2:
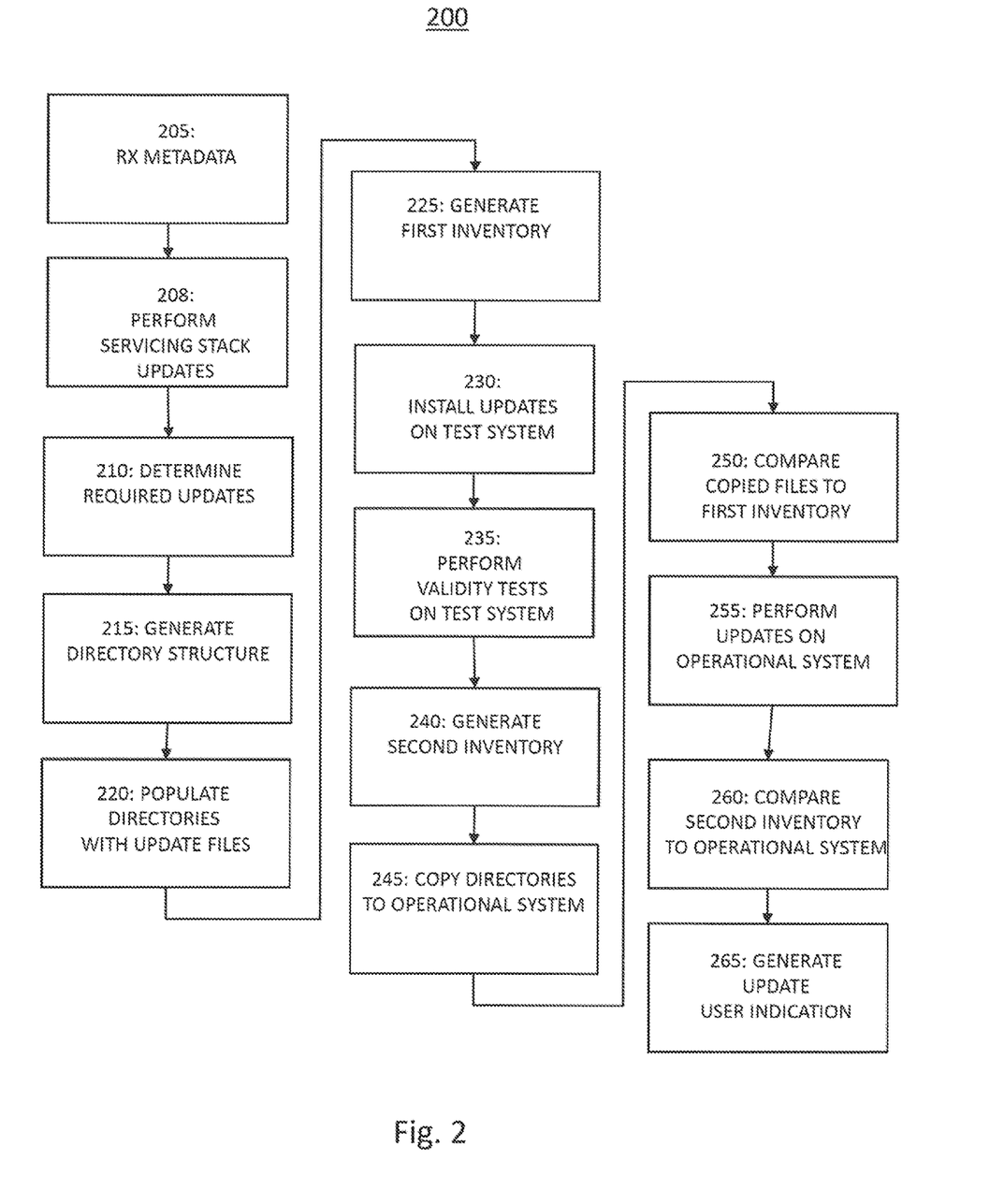
FIG. 2 is a flow diagram illustrating a non-limiting embodiment of a method for implementing secure offline software updates in accordance with the teachings of the present disclosure.

Turning now to FIG. 2, a flow diagram illustrating a non-limiting embodiment of a method 200 implementing secure offline software updates according to an exemplary embodiment of the present disclosure is shown. The method is first configured to retrieve 205 a metadata file indicative of the available updates. The metadata file may be stored in a temporary network drive, such as a QFE drive. In one exemplary embodiment, the metadata file is a WSUSSCN2.CAB offline scan file generated by Microsoft where the file contains metadata concerning security updates, update rollups, and service packs.

At this time, the method may perform 208 known servicing stack updates to ensure proper application of the update files. The method is next operative to determine 210 the updates required by the system. The method may determine if a program, program features or files related to a particular update are installed in the current system. The method may check an update log or registry to determine an update version and as to whether a particular update has previously been installed.

The method then generates 215 a directory folder structure in response to the required updates. The directory structure may be directly related to the required updates, such as a directory for each of the updates required. The directory names may be generated in response to the update file name, such as kb972696, in response to metadata associated with the update, such as "Security Intelligence Update for Microsoft Security Essentials," or a combination thereof. The use of metadata to generate the directory hierarchy may advantageously provide an indication to human controllers as to the purpose of each of the update files without requiring the human controller to separately lookup an update purpose.

The method is next operative to populate 220 the directories with the required update files. The files may be retrieved from an update file repository, such as a Microsoft update server, and placed in each of the corresponding directories. In one exemplary embodiment, the directory structure may be copied to an online computer with access to an internet connection. The directory structure may then be populated with the required update files. The directory structure populated with the required update files may then be copied to a test system such as on a QFE drive.

The method is next operative to perform 225 a first inventory of the directory structure and file. The first inventory may list the directory, file name and file details as well as metadata associated with the update files. The method is next operative to install 230 the updates on a test system. After installation, the performs 235 various validity tests on the test system to verify the installation of the updates, correct functioning of the test system after updates and the like. The method is next operative to perform 240 a second inventory of the test system file structure. The second inventory will include a list of installed files and/or a list of updated or modified files resulting from the update process.

In response to the successful validity test, the method is next configured to copy 245 the file structure to an operational system. The method compares 260 the copied file structure to the first inventory. If the copied file structure matches the first inventory, meaning that no additional update files had been added, modified, or deleted, the method performs 255 the update on the operational system in the same manner the update was performed on the test system. The method compares 260 the operational system file structure to the second inventory to ensure that the updates to the test system and the operational system were identical. At this time, a user indication may be generated 265 indicative of a successful update of the operational system.

Figure 3:
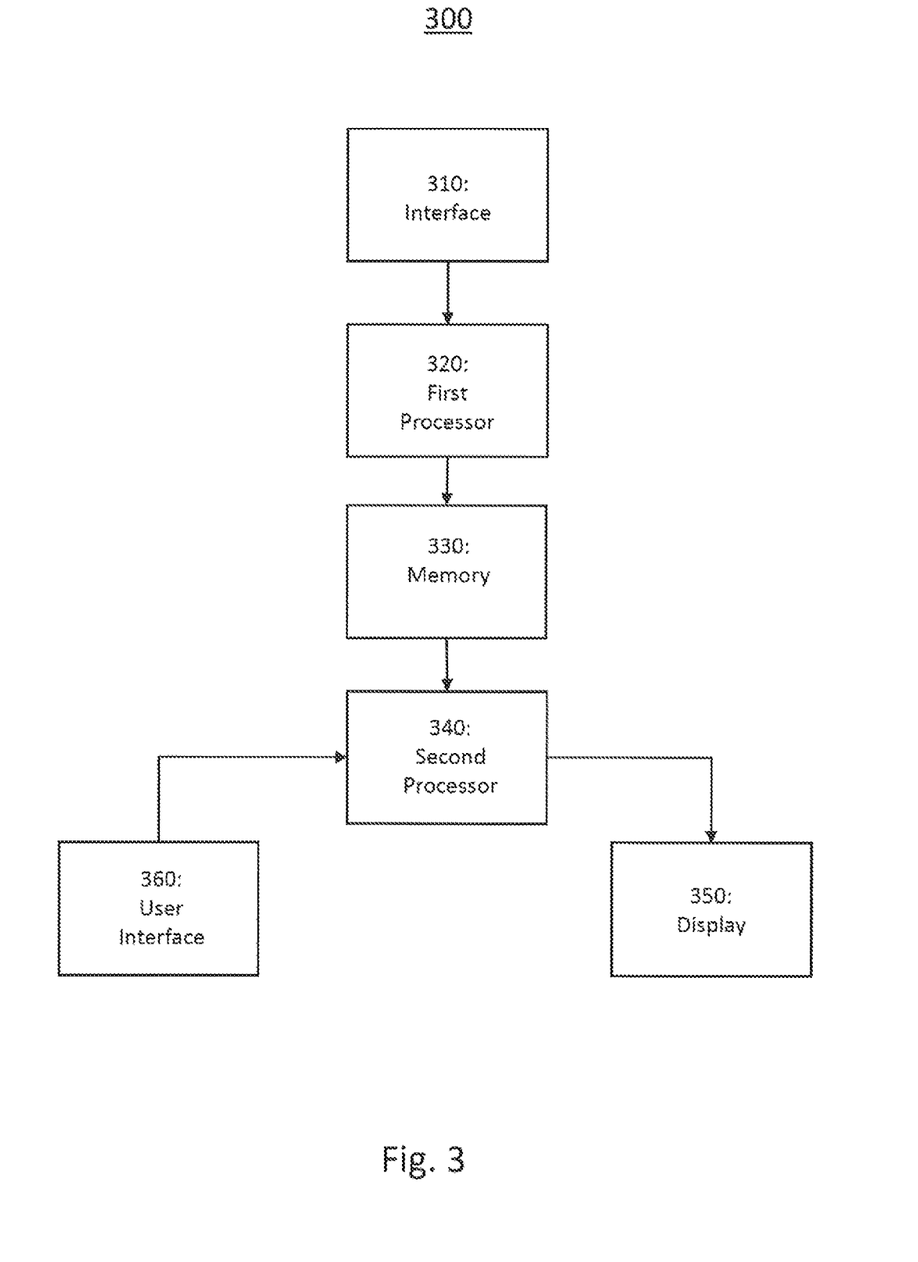
FIG. 3. is a simplified block diagram illustrating a non-limiting embodiment of a system for implementing secure offline software updates in a system in accordance with the teachings of the present disclosure.

Turning now to FIG. 3, a block diagram illustrating a system 300 for implementing secure offline software updates according to an exemplary embodiment of the present disclosure is shown. The exemplary system 300 may include an interface 310, a first processor 320, a memory 330, a second processor 340, a display 350, and a user interface 360.

In this exemplary embodiment, the interface 310 is an interface for receiving electronic data. The interface 310 may be a network interface coupled to a computer network, such as the interne, or an intranet, or may be a universal serial bus (USB) interface for receiving a USB memory device where the USB memory device may include a metadata file and/or update files. The interface 310 may be configured for receiving a metadata file indicative of a first software update and a second software update. The metadata file may be a windows cabinet file indicative of a plurality of security updates.

The first processor 320 may be configured for generating a directory structure in response to a metadata associated with the first software update and the second software update, for retrieving a first software update file and a second software update file, to perform the first software update and the second software update on a test system, and to verify a validity of the first software update and a validity of the second software update. In one embodiment, the first processor 320 may be configured to generate a first inventory of the directory structure. The second processor 340 being configured for generating a second inventory of the directory structure and performing the first software update and the second software update on in response to the first inventory matching the second inventory. Thus, the second processor 340 may confirm through the comparison that the update files and hierarchical directory structure of the test system update is the same as the update files and hierarchical directory structure to be used to update the secure computing system. the first processor is further configured to perform a servicing stack update in response to receiving the metadata file.

The memory 330 configured for storing the first software update and the second software update in the directory structure. In one exemplary embodiment, the memory 330 is a virtual hard drive, such as a QFE drive. In an alternate embodiment, the memory 330 is a portable hard drive which may be physically coupled to, and detected from, the test system and the secure computing system.

The second processor 340 may be configured for confirming the validity of the first software update and the validity of the second software update and for performing the first software update and the second software update on a secure computing system in response to a positive confirmation of the validity of the first software update and the validity of the second software update. In response to a successful performance of the execution of the update on the secure computing system, the second processor 340 may be further configured for generating an indication of an update of the secure computing system. The indication may be coupled to a display 250 for notification to a network administrator or system user.; and The display 350 configured to display the directory structure and the indication of the update of the secure computing system. The display may further be configured to receive and display user prompts to facilitate user inputs via the user interface 360. The user interface 360 may be configured to receive user inputs, such as approval of execution of the update of the secure computing system/ In one exemplary embodiment, the second processor 340 performs the first software update and the second software update in response to the display 350 displaying the directory structure and receiving a user input via the user interface 360. The exemplary system may further include a user interface 360 such that the second processor performs the first software update and the second software update in response to the display displaying the directory structure and receiving a user input via the user interface.

In an exemplary embodiment, the system 300 may be a computing device, including a first processor 320 for generating a hierarchical directory structure on a virtual hard drive in response to an update metadata file, for retrieving an update file, for executing the update file on a test system, for validating the update on the test system, and for storing the update file within the hierarchical directory structure in response to a positive validation of the update on the test system. The system may further include a user interface for displaying the hierarchical directory structure, an indication of the positive validation of the update on the test system, and for receiving a user input. In response to the information generated by the first processor and the user interface, a second processor 340 for retrieving the update file from the hierarchical directory structure on the virtual hard drive and executing the update file on an operation system in response to the user input. The first processor 320 may be further configured to generate a first inventory of the hierarchical directory structure before executing the update file on the test system and wherein the second processor is further configured to generate a second inventory of the hierarchical directory structure and wherein the executing the update file on the operation system is performed in response to the first inventory matching the second inventory.

Figure 4:
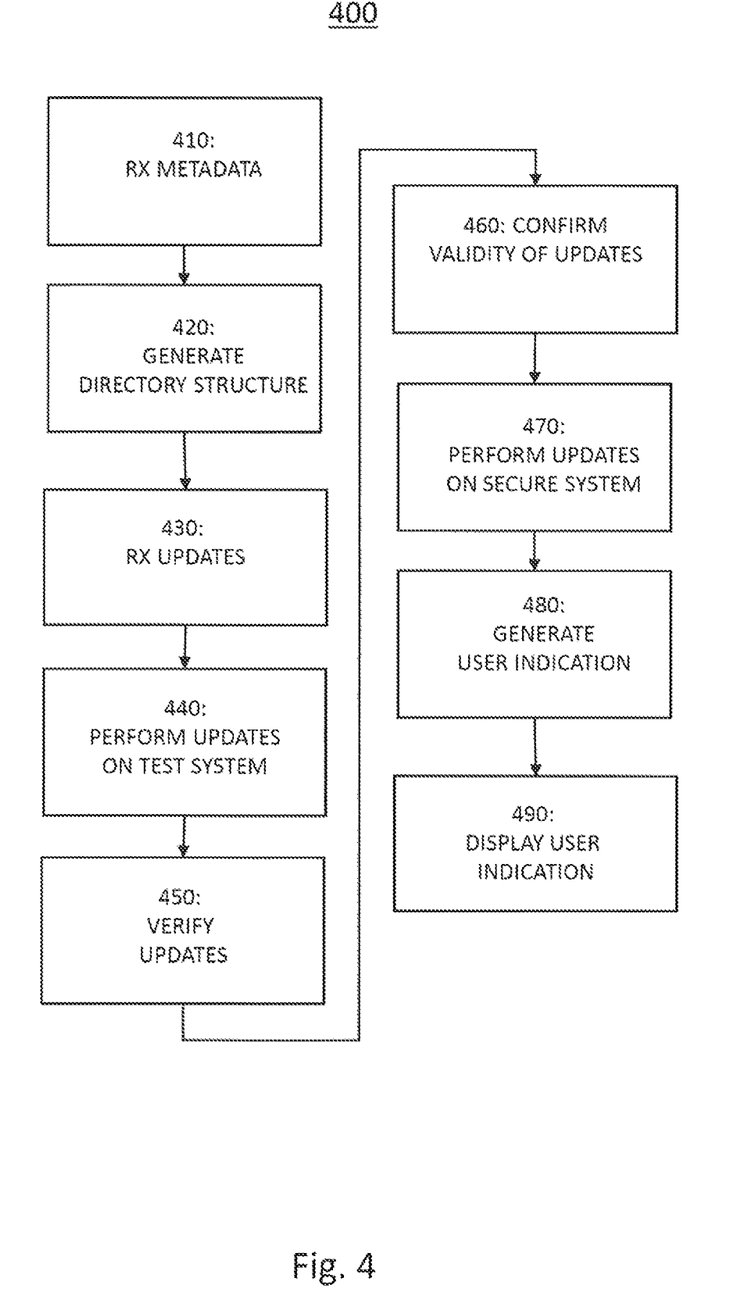
FIG. 4 shows a flow diagram illustrating a non-limiting embodiment of a method for implementing secure offline software updates in accordance with the teachings of the present disclosure.

Turning now to FIG. 4, a flow diagram illustrating another non-limiting embodiment of a method 400 for implementing secure offline software updates, according to an exemplary embodiment. The exemplary method 400 may be first operative for receiving 410, by a network interface, a metadata file indicative of a first software update and a second software update. In one exemplary embodiment, the metadata file may be a WSUSSCN2.CAB file from Microsoft having metadata related to security updates and the like.

The method may next be operative for generating 420, by a first processor, a directory structure in response to a metadata associated with the first software update and the second software update. The directory structure may be a hierarchical directory structure where the directory names are generated in response to metadata associated with an individual software update or software update file.

The method may next retrieve 430, by the first processor, a first software update file and a second software update file and place these updates into the appropriate directory within the hierarchical directory structure. In one embodiment, the method may generate a first inventory of the populated hierarchical directory structure before executing the update. The method is then configured for performing 440, by the first processor, the first software update and the second software update on a test system. Next, the method may verify 450, by the first processor, a validity of the first software update and a validity of the second software update to ensure the successful operation and execution of the updates. The method may then generate a final inventory of the hierarchical directory structure for confirmation of the execution of the updates.

The method may next be configured for confirming 460, by a second processor, the validity of the first software update and the validity of the second software update, ., generating, by the second processor, a second inventory of the directory structure and performing, by the second processor, the first software update and the second software update on in response to the first inventory matching the second inventory.

The method is next configured for performing 470, by the second processor, the first software update and the second software update on a secure computing system in response to a positive confirmation of the validity of the first software update and the validity of the second software update. In response to the successful installation of the updates on the test system, the method may then install the updates on the secure computing system. This installation may be performed after performing a second inventory on the hierarchical directory structure, comparing this inventory to the first inventory to confirm the same file structure and file information.

The method may the generate 480, by the second processor, an indication of an update of the secure computing system display 490, by a user interface, the directory structure and the indication of the update of the secure computing system. The user interface and the user input may both be part of a touch screen user interface device or the like. The execution of the update of the secure computing system my be further initiated in response to the display of the directory structure to a network administrator or user and receipt of a selection from the user via the user interface to execute the update.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. For example, some exemplary embodiments are described above with reference to components and files associated with a Microsoft Windows environment; however, those of ordinary skill in the art should recognize that the Software Update control system design may be readily adapted and used with other operating systems and application software for provisioning computer systems or other computing equipment with automated software update algorithms. In this regard, the foregoing detailed description should be regarded as providing those of ordinary skill in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

As used herein, the term processor refers to any hardware, software embodied in a medium, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that perform the described algorithms.

It is further noted that the systems and methods may be implemented on various types of data processor environments (e.g., on one or more data processors) which execute instructions (e.g., software instructions) to perform operations disclosed herein. Non-limiting examples include implementation on a single general purpose computer or workstation, or on a networked system, or in a client-server configuration, or in an application service provider configuration. For example, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein. For example, a computer can be programmed with instructions to perform the various steps of the flowcharts described herein. The software components and/or functionality may be located on a single computer or distributed across multiple computers.

What is claimed is:

1. An apparatus comprising:
an interface configured for receiving a metadata file indicative of a first software update and a second software update;
a first processor configured for generating a directory structure in response to a metadata associated with the first software update and the second software update, for retrieving a first software update file and a second software update file, for performing the first software update and the second software update on a test system, and for verifying a validity of the first software update and a validity of the second software update;
a memory configured for storing the first software update and the second software update in the directory structure;
a second processor configured for confirming the validity of the first software update and the validity of the second software update, for performing the first software update and the second software update on a secure computing system in response to a positive confirmation of the validity of the first software update and the validity of the second software update and for generating an indication of an update of the secure computing system; and
a display configured for display the directory structure and the indication of the update of the secure computing system.

2. The apparatus of claim 1 further comprising:
the first processor further configured for generating a first inventory of the directory structure; and
the second processor further configured for generating a second inventory of the directory structure;
wherein the first software update and the second software update are performed when the first inventory matches the second inventory.

3. The apparatus of claim 1 wherein the interface is further configured for receiving the first software update and the second software update and for sending the first software update and second software update to the first processor.

4. The apparatus of claim 3, wherein the interface is further configured for receiving the metadata file, the first software update and the second software update via an offline file transfer.

5. The apparatus of claim 1 where the interface comprises a universal serial bus port.

6. The apparatus of claim 1 wherein the metadata file comprises a windows cabinet file indicative of a plurality of security updates.

7. The apparatus of claim 1 wherein the first processor is further configured for performing a servicing stack update in response to receiving the metadata file.

8. The apparatus of claim 1 wherein the memory comprises a virtual hard drive.

9. The apparatus of claim 1, wherein the display further comprises a user interface for generating a user input, wherein the second processor performs the first software update and the second software update in response to the display displaying the directory structure and receiving the user input via the user interface.

10. A method comprising:
receiving, by a network interface, a metadata file indicative of a first software update and a second software update;
generating, by a first processor, a directory structure in response to a metadata associated with the first software update and the second software update;
retrieving, by the first processor, a first software update file and a second software update file;
performing, by the first processor, the first software update and the second software update on a test system;
verifying, by the first processor, a validity of the first software update and a validity of the second software update;
confirming, by a second processor, the validity of the first software update and the validity of the second software update;
performing, by the second processor, the first software update and the second software update on a secure computing system in response to a positive confirmation of the validity of the first software update and the validity of the second software update;
generating, by the second processor, an indication of an update of the secure computing system; and
displaying, by a user interface, the directory structure and the indication of the update of the secure computing system.

11. The method of claim 10 further comprising:
generating, by the first processor, a first inventory of the directory structure;
generating, by the second processor, a second inventory of the directory structure; and
performing, by the second processor, the first software update and the second software update when the first inventory matches the second inventory.

12. The method of claim 10 further comprising receiving, by the interface, the first software update and the second software update and sending the first software update and second software update to the first processor.

13. The method of claim 10 further comprising receiving, by the interface, the metadata file, the first software update and the second software update via an offline file transfer.

14. The method of claim 10 where the interface comprises a universal serial bus port.

15. The method of claim 10 wherein the metadata file comprises a windows cabinet file indicative of a plurality of security updates.

16. The method of claim 10 further comprising performing, by the first processor, a servicing stack update in response to receiving the metadata file.

17. The method of claim 10 wherein the memory comprising a virtual hard drive.

18. The method of claim 10 further comprising:
generating, by the user interface, a user input;
displaying, by a display of the user interface, the directory structure; and
performing, by the second processor, the first software update and the second software update in response to displaying the directory structure and receiving the user input via the user interface.

19. A computing device, comprising:
a first processor configured for generating a hierarchical directory structure on a virtual hard drive in response to an update metadata file, for retrieving an update file, for executing the update file on a test system, for validating the update on the test system, and for storing the update file within the hierarchical directory structure in response to a positive validation of the update on the test system;
a user interface configured for displaying the hierarchical directory structure and an indication of the positive validation of the update on the test system, and for generating a user input; and a second processor for retrieving the update file from the hierarchical directory structure on the virtual hard drive and executing the update file on an operation system in response to receiving the user input via the user interface.

20. The computing device of claim 19 further comprising:

the first processor further configured for generating a first inventory of the hierarchical directory structure before executing the update file on the test system; and the second processor further configured for generating a second inventory of the hierarchical directory structure;

wherein the update file on the operation system is executed when the first inventory matches the second inventory.

* * * * *